(12) United States Patent  
Danton et al.

(10) Patent No.: US 8,516,391 B2  
(45) Date of Patent: *Aug. 20, 2013

(54) CONTROLLED INTERACTION WITH HETEROGENEOUS DATA

(75) Inventors: Stephen Michael Danton, Seattle, WA (US); Florian Voss, Seattle, WA (US); Siddharth Jayadevan, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/416,177

(22) Filed: Mar. 9, 2012

(65) Prior Publication Data

US 2012/0223962 A1 Sep. 6, 2012

Related U.S. Application Data

(63) Continuation of application No. 12/143,553, filed on Jun. 20, 2008, now Pat. No. 8,156,445.

(51) Int. Cl.
*G06F 3/048* (2006.01)
*G06F 17/00* (2006.01)

(52) U.S. Cl.
USPC ............ 715/788; 715/247; 715/784; 715/799

(58) Field of Classification Search
USPC ................. 715/246, 247, 788, 805, 833, 846, 715/847, 798–801
See application file for complete search history.

(56) References Cited

U.S. PATENT DOCUMENTS

| 4,831,556 | A  | * | 5/1989  | Oono ............................ 715/786 |
| 5,634,129 | A  | * | 5/1997  | Dickinson ..................... 719/315 |
| 5,751,283 | A  |   | 5/1998  | Smith |
| 6,282,547 | B1 |   | 8/2001  | Hirsch |
| 6,657,644 | B1 |   | 12/2003 | Plow et al. |
| 7,051,289 | B1 | * | 5/2006  | Yoshida ........................ 715/784 |
| 7,216,293 | B2 | * | 5/2007  | Kataoka et al. ............... 715/246 |
| 7,251,693 | B2 |   | 7/2007  | Stull et al. |

(Continued)

FOREIGN PATENT DOCUMENTS

WO  WO2006126135  11/2006

OTHER PUBLICATIONS

Parker et al., "Visualization of Large Nested Graphs in 3D: Navigation and interaction", Journal of Visual Languages and Computing, vol. 9, No. 3, Jun. 1998, pp. 299-317.

(Continued)

*Primary Examiner* — Omar Abdul-Ali
*Assistant Examiner* — Andrew Tank
(74) *Attorney, Agent, or Firm* — Workman Nydegger

(57) ABSTRACT

A two-dimensional canvas onto which heterogenic objects of various types may be arranged side-by-side. Each type of object has an associated set of control(s), the control(s) at least partially differing from one type to the next. The two-dimensional canvas is fixed in one dimension, but extensible in a second dimension. The canvas may be displayed in miniaturized for with a view box superimposed upon the canvas. As the view box is moved over the miniaturized canvas, the enlarged editable portion of the corresponding canvas is displayed in an edit view. The canvas may also display clusters of objects that are arranged in dashboards. In that case, the display might include a dashboard review area that allows a user to select the appropriate dashboard to display.

20 Claims, 15 Drawing Sheets

(56) References Cited

U.S. PATENT DOCUMENTS

| | | | |
|---|---|---|---|
| 7,460,021 | B1 | 12/2008 | Bacon |
| 7,460,134 | B2 | 12/2008 | Robertson et al. |
| 7,657,845 | B2 | 2/2010 | Drucker et al. |
| 7,954,064 | B2 | 5/2011 | Forstall et al. |
| 8,286,101 | B2 * | 10/2012 | Kupka ............... 715/863 |
| 2004/0174398 | A1 | 9/2004 | Luke et al. |
| 2005/0125739 | A1 | 6/2005 | Thompson et al. |
| 2005/0187931 | A1 | 8/2005 | Cofino et al. |
| 2005/0226495 | A1 | 10/2005 | Li |
| 2005/0228250 | A1 * | 10/2005 | Bitter et al. ............ 600/407 |
| 2006/0010394 | A1 | 1/2006 | Chaudhri et al. |
| 2006/0224997 | A1 | 10/2006 | Wong et al. |
| 2007/0147685 | A1 | 6/2007 | Ericson |
| 2007/0188494 | A1 | 8/2007 | Agutter et al. |
| 2007/0299828 | A1 | 12/2007 | Lewis et al. |
| 2008/0104535 | A1 | 5/2008 | DeLine et al. |
| 2009/0083655 | A1 | 3/2009 | Beharie et al. |
| 2010/0115431 | A1 | 5/2010 | Holte |

OTHER PUBLICATIONS

North et al., "Snap-Together Visualization: Coordinating Multiple Views to Explore Information", University of Maryland Computer Science Dept. Technical Report #CS-TR-4020, 1988 (11 pages) (The year of publication is clearly prior to the filing of the Application. The month of publication is therefore irrelevant).

Bezerianos et al., "Canvas Portals: View and Space Management on Large Displays", In IEEE Computer Graphics & Applications, Special Issue on Applications of Large Displays, vol. 25, No. 4, Jul./Aug. 2005, pp. 34-43.

Interfaces for Visualizing Multi-Valued Attributes: Design and Implementation Using Starfield Displays http://hcil.cs.umd.edu/trs/99-20/90-20.ps (97 pages) Sep. 1999.

Personalized Navigation of Heterogeneous Product Spaces using SmartClient http://hci.epfl.ch/publications/2001/pu-faltings-context-2002.pdf dated 2002 (8 pages) (The year of publication is clearly prior to the filing of the Application. The month of publication is therefore irrelevant).

Visual Information Seeking: Tight Coupling of Dynamic Query Filters with Starfield Displays http://hcil.cs.umd.edu/trs/93-14/93-14.html dated 1994 (9 pages) (The year of publication is clearly prior to the filing of the Application. The month of publication is therefore irrelevant).

Starfield Information Visualization with Interactive Smooth Zooming http://citeseer.est.psu.edu/cache/papers/cs/1234/ftp:zSzzSzftp.cs.umd.eduzSzpubzSzpaperszSzpapersSzncstrl.umcpzSzCS-TR-3286zSzCS-TR-3286.pdf/jog95starfield.pdf dated 1995 (10 pages) (The year of publication is clearly prior to the filing of the Application. The month of publication is therefore irrelevant).

U.S. Appl. No. 12/143,553, filed Jun. 23, 2011 Office Action.

U.S. Appl. No. 12/143,553, filed Dec. 22, 2011 Notice of Allowance.

* cited by examiner

CONTROLLED INTERACTION WITH HETEROGENEOUS DATA

CROSS-REFERENCE TO RELATED APPLICATIONS

This application is a continuation of U.S. patent application Ser. No. 12/143,553, which was filed on Jun. 20, 2008, entitled "CONTROLLED INTERACTION WITH HETEROGENEOUS DATA," and which application is hereby expressly incorporated herein in its entirety.

BACKGROUND OF THE INVENTION

Computing systems, especially general-purpose computing systems, are capable of performing a wide-variety of functions. Typically, the functionality is directed by the active application that is running on the patent application. Applications are generally directed towards a certain set of tasks. When a user wants to move from one computer-aided task to another, a user typically switches from one application to another.

For instance, if one wants to add a calendar item to a calendar, the user might open or switch to a calendar application to make that entry. If the user then wants to edit a document, the user might cause the computer to switch to a word processing application. If the user then wants to view a video clip, the user might switch to a video application.

It can take significant computing resources and sometimes time to switch contexts from one active application to another, even when the applications to be used are already open. If the application to be used is not yet open, it takes that much more resources to get the application opened in the first place.

BRIEF SUMMARY OF THE INVENTION

Embodiments described herein allow for the formation of a two-dimensional canvas onto which heterogenic objects of various types may be arranged side-by-side. Each type of object has an associated set of control(s), where the set of controls may differ from one type to the next, and wherein the control are appropriate for each type. Upon detecting user interaction with the canvas, the system identifies an object that the user is interacting with, identifies the objects type, and then identifies and invokes the appropriate control given the type and given the user interaction. The two-dimensional canvas is fixed in one dimension (e.g., one of vertical or horizontal), but extensible in a second dimension (the other of vertical or horizontal). Thus, a user can interact with different types of objects and associated controls using a single edit area, rather than having to switch contexts between applications in order to work with the various objects.

Embodiments described herein also allow for the display of an interactive board work area that may also allow interaction with heterogenic objects, but now arranged into boards. The display includes a board edit area for displaying the objects of the selected board. The display also includes a board preview area that includes a preview of at least some of the available boards, and that includes a board selection mechanism for selecting the board to be displayed in the board edit area. Thus, an advanced and extensible mechanism for organizing related objects into boards, and editing and interacting with those boards is also provided.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION OF THE PREFERRED EMBODIMENTS

In accordance with embodiments described herein, a two-dimensional canvas onto which heterogenic objects of various types may be arranged side-by-side. Each type of object has an associated set of control(s), the control(s) at least partially differing from one type to the next. Upon detecting user interaction with the canvas, the system identifies an object that the user is interacting with, identifies the objects type, and then identifies and invokes the appropriate control given the type and given the user interaction. First, some introductory discussion regarding computing systems will be described with respect to FIG. 1. Then, various embodiments of user interface that permit editing of objects laid out on a canvas will be described with respect to FIGS. 2 through 15.

Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

Figure 1:
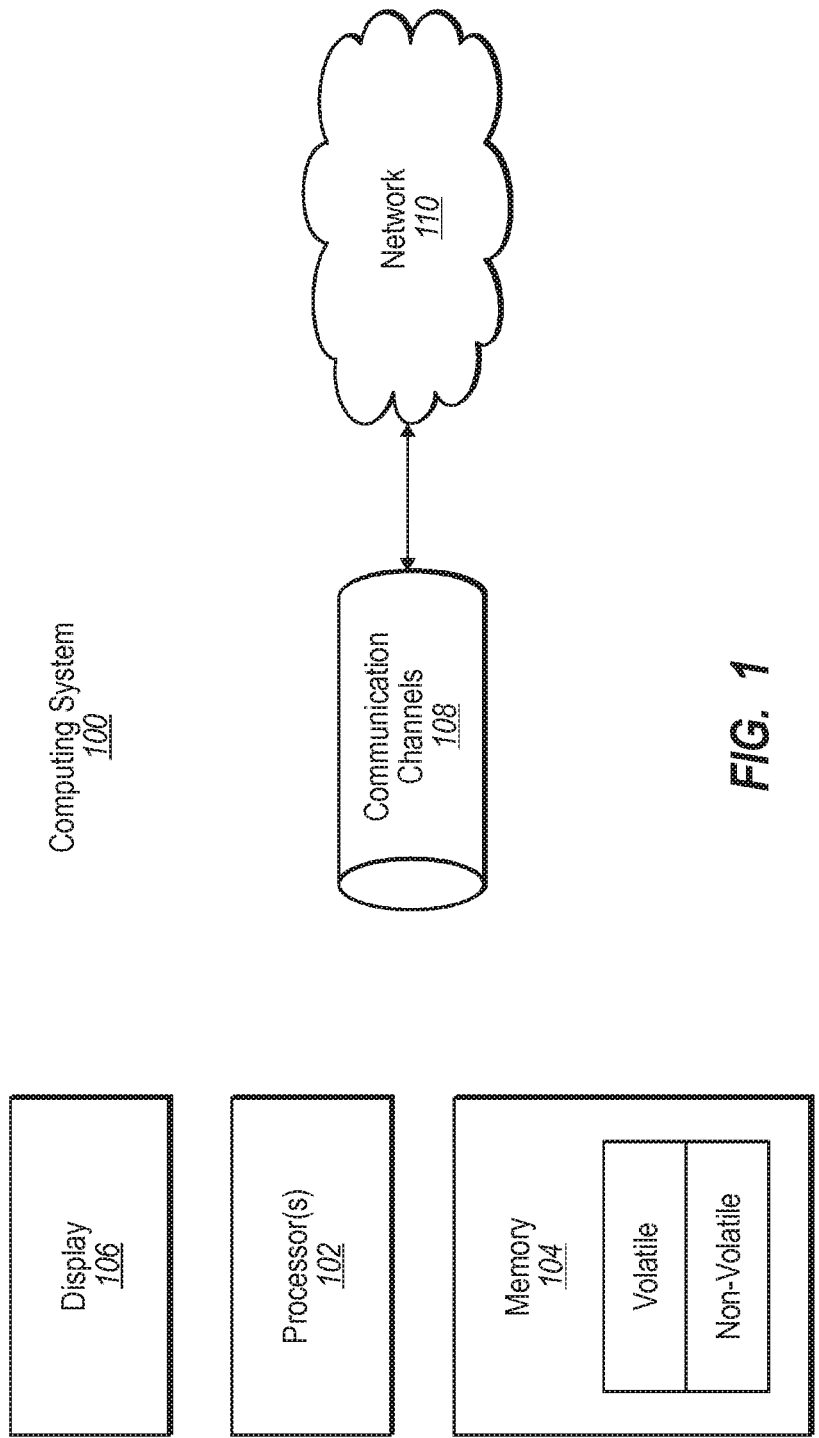
FIG. 1 illustrates an example computing system that may be used to employ embodiments described herein.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Part of the acts directed by the processing unit(s) 102 may be to display certain information on a display 106. The display 106 is illustrated as being a particular form in FIG. 1. However, the nature and size of the display 106 may differ depending on the physical form of the computing system 100. Since the computing system 100 may take on a wide variety of physical forms, the display 106 may also have a wide variety of physical forms.

Computing system 100 may also contain communication channels 108 that allow the computing system 100 to communicate with other message processors over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Figure 2:
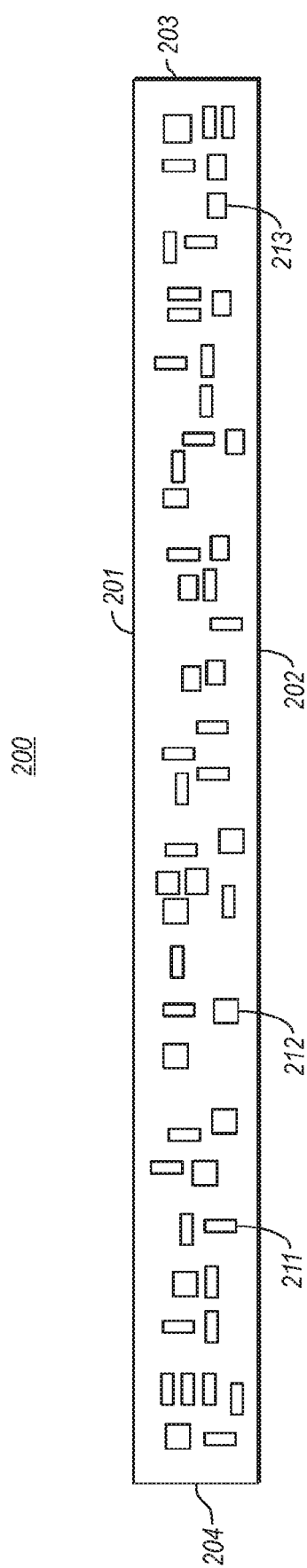
FIG. 2 illustrates a two-dimensional canvas onto which may be positioned heterogenic objects of a variety of types.

FIG. 2 illustrates a two-dimensional canvas 200 onto which may be positioned multiple heterogenic objects of a variety of types. The term "types" when used to describe the objects on the canvas need not align with the conventional definition of "types" used when describing objects in object-oriented programming, although the definitions may sometimes align. In this description, a "type" of object is defined more by the controls that are available to the object. In this description, two objects are of the same type if the set of control(s) that are available to the objects are the same and are invoked using the equivalent user interaction, even if the type definitions themselves are different. Also, two objects are of different types if there is at least one control of one of the objects that is not available to the other object, or if the type of user interaction used to invoke at least one of the controls is different between the types. In other words, the set of control(s) that are available to one type of object when viewed collectively is distinct. For instance, taking an abstract example, one object type may offer controls A, B, and D, while another object type may offer controls A, C and F. While there is one control that is identical between the two types (e.g., control A), the controls when viewed collectively (ABD versus ACF) are different. Thus, the two objects types are different.

There is no limit to the number or amount of types of objects that can be placed in the canvas 200. Each of the types has associated therewith a set of one or more controls, as previously mentioned. The canvas 200 is illustrated as including a number of objects, only a few of which are labeled in order to avoid unnecessary complication of FIG. 2. In this example, only objects 211, 212 and 213 are labeled. The canvas 200 is quite flexible in that it allows any number of objects to be laid out upon the canvas. The objects types may be any types. For instance, a video object may be presented, and include a certain number of controls, such as "play", "pause", "video selection", "chapter selection", "rewind", "fast-forward", "chapter skip", and other types of controls appropriate for a video. Different video objects may be different types if the controls they offer are different, or if the manner that the controls are invoked via user interaction is different. Word processing document objects may be another type of object. Other examples of object types include, calendar objects, e-mail objects, graphics editor objects, and so forth. There is literally no limit to the number and type of objects that may be placed on the canvas.

The canvas 200 has the appearance of a horizontal ribbon, although the principles would also apply to a canvas that had the appearance of a vertical ribbon. The two-dimensional canvas is fixed in a first direction. For instance, in the case of the horizontal ribbon form that appears in FIG. 2, the vertical boundaries 201 and 202 may be constrained such that objects cannot be placed on the canvas above the upper boundary 201 or below the lower boundary 202. In the case of a vertical ribbon example, it would be the left and right boundaries that are constrained.

However, in the other dimension, the canvas is extendible in at least one of the two directions such that if an object is to be placed in the first direction in the second dimension beyond a boundary of the two-dimensional canvas, the boundary is extended in the first direction such that the two-dimensional canvas includes the object. As an example, in the horizontal ribbon example of FIG. 2, if an object was to be placed on the canvas 200 to the left of the left boundary 204, and the boundary 204 was extensible, the left boundary 204 would be moved to the left so that the object could be placed in the confines of the canvas. This extensibility may have a limit. In other cases, the extensibility may be practically, if not actually, limitless, thereby simulating an infinite canvas.

Alternatively or in addition, the two-dimensional canvas may be extensible in the opposite direction in the second dimension as well. As an example, in the horizontal ribbon example of FIG. 2, if an object was to be placed on the canvas to the right of the right boundary 203, and the boundary 203 was extensible, the right boundary 203 would be moved to the right so that the object could be placed in the confines of the canvas. In the vertical ribbon example (not shown), the left and right boundaries may be confined, whereas the upper and/or lower boundaries may be extensible.

Figure 3:
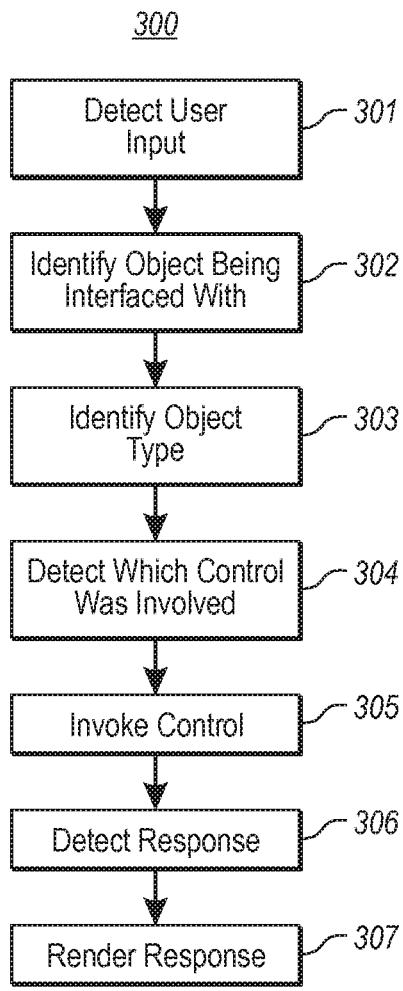
FIG. 3 illustrates a flowchart for responding to user interaction with one of the objects in the two-dimensional canvas.

FIG. 3 illustrates a flowchart of a method 300 for responding to user interaction with one of the objects in the two-dimensional canvas. Perhaps only a portion of the canvas 200 may be displayed on a display at any given one time. Subsequent figures will illustrate (and associated description will describe) a mechanism for navigating the canvas 200 so that a user may interact with the objects that are displayed in the displayed portion of the canvas. Nevertheless, however the navigation occurs, once an object is displayed, that object may be interacted with in a manner and user controls that are appropriate for the corresponding type of the object.

Upon detecting user input (act 301), the object that the user is interfacing with is identified using the detected user input (act 302). For instance, if the user's pointer (e.g., the mouse arrow indicator) is within the confines of a particular object, the system may identify that it is that particular object that the user is interfacing with. If the user's pointer is not over a particular object, the system may not be able to identify a corresponding object that the user is interfacing with. Alternatively, the system might calculate the closest object or use some other algorithm to try to detect the object that the user wants to interface with.

Once the object is identified (act 302), the type of the object is then identified (act 303). When an object is added to the canvas, the object may register its type with the canvas logic to help the system identify the corresponding type of the object.

The system then identifies which of the one or more controls of the identified type of object are being invoked via the user input (act 304). The system may have an awareness of the types of controls associated with the object type being invoked, as well as the types of user input that might trigger any of the controls. Alternatively, the object may also register its controls with the system along with also a specification for what types of user input should trigger a control.

Once the control is identified (act 304), the control is invoked (act 305), which causes the underlying logic of the control to execute. At some point this execution may result in a response. If there is such a response, the system might detect the response (act 306), and render the response (act 307). In one embodiment, the underlying logic of the object may interface directly with the rendering engine to accomplish this. In other embodiments, the canvas logic may perform some transformation on the result of the invocation of the control, to cause the response to be rendered, and then interface the transformed result to be rendered by the rendering engine.

Figure 4:
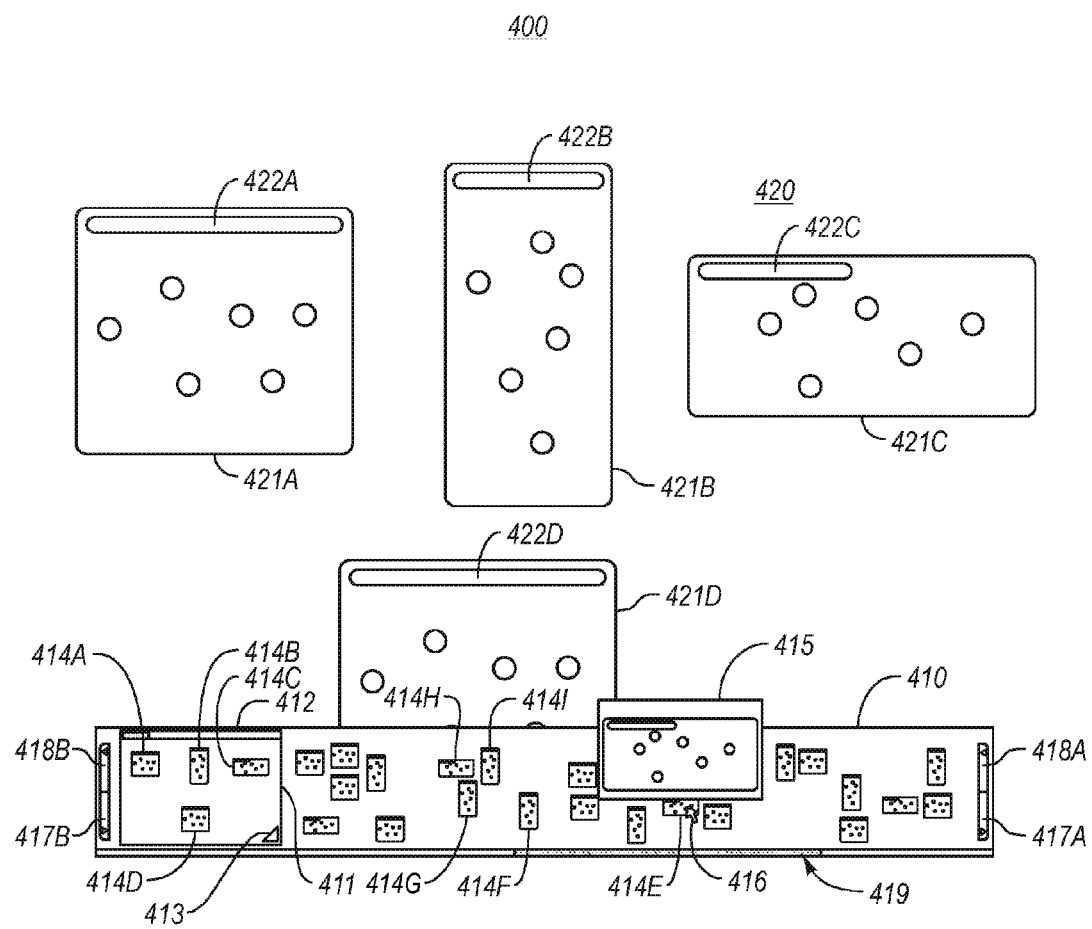
FIG. 4 illustrates a user interface in which at least a portion of the two-dimensional canvas of FIG. 2 is displayed in miniaturized form.

As previously mentioned, not all of the canvas 200 of FIG. 2 may be displayed on the display at a single time. Accordingly, FIG. 4 illustrates a user interface 400 in which at least a portion of the two-dimensional canvas of FIG. 2 is displayed in miniaturized form as element 410. The miniaturized representation of the two-dimensional canvas (hereinafter also referred to as the "miniaturized navigation canvas") includes (for at least some of the objects of the canvas) a miniaturized representation of the heterogenic objects placed on the canvas at approximately the corresponding positions. Not all of the miniatures objects laid out in the miniaturized canvas are labeled. However, a few are labeled since they are referred to further in this description. Those few miniaturized objects include miniaturized objects 414A through 414I. The miniaturized objects and the objects in the canvas itself are illustrated as containing dots. This is an abstract mechanism only used to allow the reader to see better correlation between the miniaturized and full-sized form of the objects. In actuality, the content of an object would correspond to its type. For example, a video object may display the video itself, an e-mail object may display the e-mail content, with appropriate headers, and so forth.

In this case, even in miniaturized form, the miniaturized navigation canvas cannot all fit in the confines of a display. Accordingly, only a portion of the miniaturized navigation canvas is displayed. Rightward scroll controls 417A and 417B may be used to scroll rightward to allow more of the rightward portions of the miniaturized navigation canvas to come into view. Leftward scroll controls 418A and 418B may be used to scroll leftward to allow more of the leftward portions of the miniaturized navigation canvas to come into view. A scroll indicator 419 represents a relative position of the displayed portion of the miniaturized navigation canvas in the context of the entire length of the miniaturized navigation canvas. The length of the scroll indicator 419 may give some idea as to the relative length of the entire miniaturized navigation canvas as compared to the displayed length of the miniaturized navigation canvas. For instance, a shorter length of the control indicator 419 may indicate a longer miniaturized navigation canvas.

The miniaturized navigation canvas 410 may be configured to provide a richer preview of any of the miniaturized objects in the miniaturized navigation canvas. For instance, FIG. 4 shows a user's pointer 416 hovering over miniaturized object 414E, causing a richer preview 415 of the object to appear.

Superimposed upon the miniaturized navigation canvas 410 is a view box 411. The position of the view box 411 defines what is displayed in the edit view 420 of the user interface. Specifically, the positions of the upper, lower, right, and left boundaries of the view box 411 within the miniaturized navigation campus 410 set the upper, lower, right, and left boundaries, respectively, of the campus displayed in the edit view 420. This results in the miniaturized objects represented within the view box 411 to be displayed in the edit view 420 in full-sized interactive form. For instance, miniaturized objects 414A through 414D contained within view box 411 in a relative position are reflected in the edit view 420 in their relative positions as objects 421A through 421D, respectively. The objects in the edit view 420 are fully interactive such that the one or more controls associated with the object are accessible to the user. It is the interaction in the edit view 420 that may cause the user interaction that triggers the method 300 of FIG. 3 to invoke the underlying object controls.

Each object 421A through 421D might include a standard title bar 422A through 422D that may include the particular controls that are available to the corresponding type of object. If the objects displayed are heterogeneous, then different actions might be made available on each title bar as appropriate given the corresponding type of object. There might also be some standard actions available in the title bars that may be made available to all types of objects. For example, a delete or copy operation might be standard. A resize, minimize, or full-screen control might also be available. The title bar might also be used to drag and drop the object from one location to another in the canvas.

Figure 5:
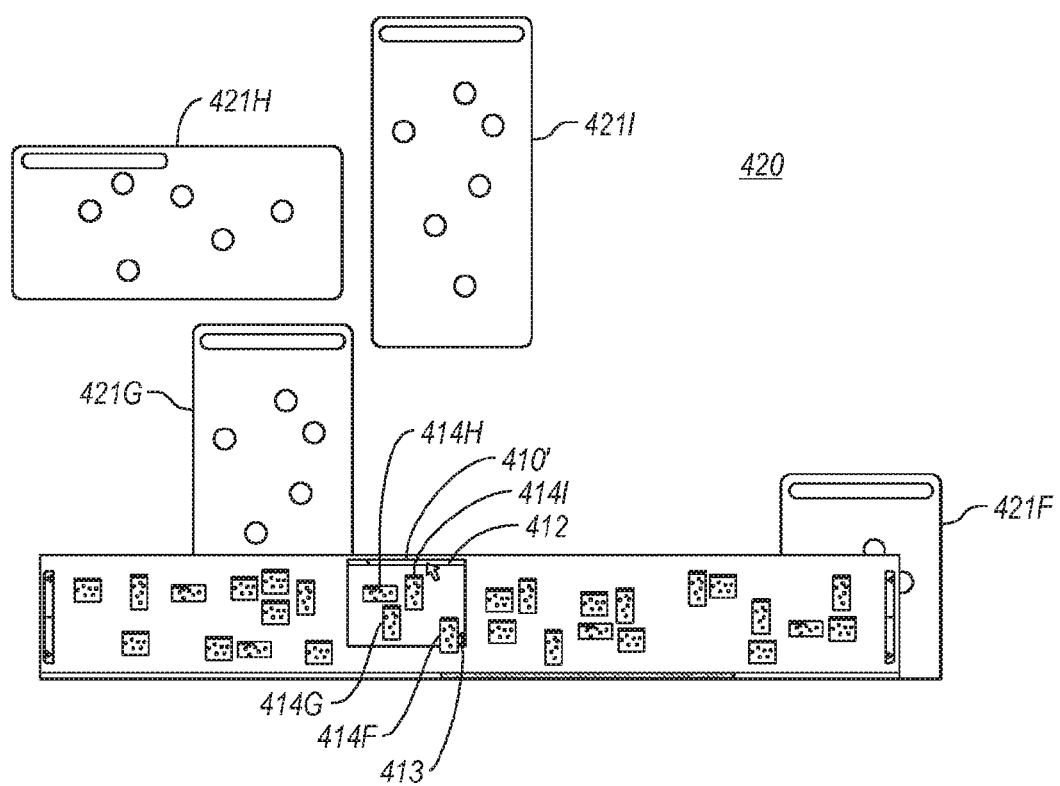
FIG. 5 illustrates the user interface of FIG. 4, except with the view box being translationally moved and resized.

The view box 411 also includes translational movement control 412 and a resize control 413, the purpose of which will be described below with respect to FIG. 5. FIG. 5 illustrates a user interface 500 which is similar to the user interface 400 of FIG. 4, except with the view box 410' being translationally moved and resized. Translational movement (i.e., movement horizontally and or vertically without resizing) may, in one embodiment, be accomplished by dragging the translational movement control 412 to an appropriate location, and then dropping at the desired location. Resizing of the view box 410' to generate a smaller view box 410' may be accomplished by manipulating the resizing control 413 of the view box 410'. The translational and resizing operations may be performed independently, along FIG. 5 shows a situation after both a translational movement and resizing operation have been performed on the view box 411 of FIG. 4.

By moving the view box 411, the user can cause the edit view to navigate to different parts of the canvas to interface with objects at different areas of the canvas. By resizing the view box 411, the user can zoom in and out on portions of the canvas. In one embodiment, the resizing of the view box 411 is limited such that the zooming operations of the edit view 420 is limited. In FIG. 4, for example, the view box 411 may be maximum sized, thereby zooming out as far as can be done in the edit view 420. In FIG. 5, for example, the size of the view box 410' might be at a minimum, thereby zooming in on the canvas in the edit view 420 as far as can be done. By constraining the zooming operation in this manner, the complexity of the user interface is reduced thereby in some sense making the user interface easier to master by a user.

In the case of FIG. 5, the edit view illustrates objects 421F through 421I in the relative positions corresponding to respective miniaturized objects 414F through 414I within the modified view box 410'. Thus, the view box may be manipulated to allow the user to cause any portion of the canvas to appear in the edit view 420 while still allowing the user to maintain a contextual understanding of the position of the view area relative to the larger canvas.

Figure 6:
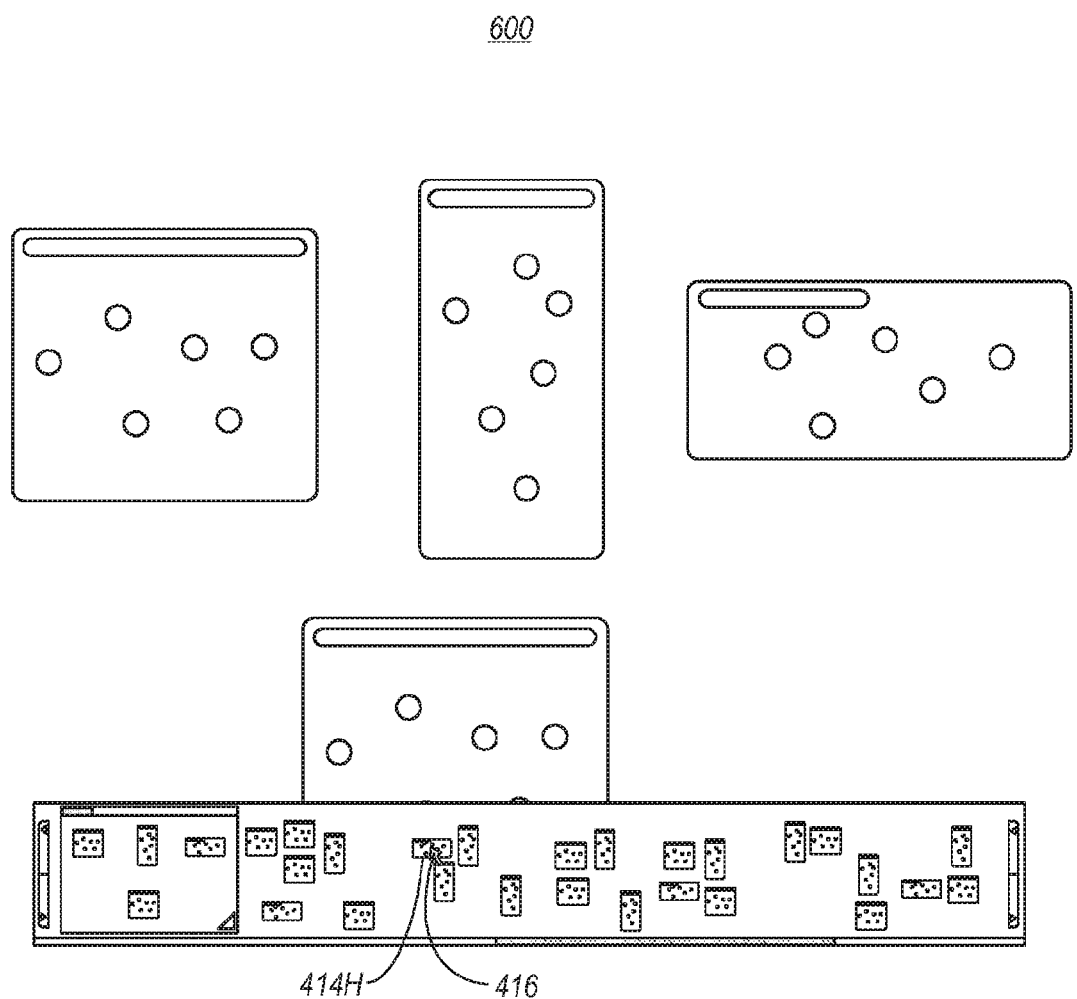
FIG. 6 illustrates the user interface of FIG. 4, except with one of the miniaturized objects being selected.
Figure 7:
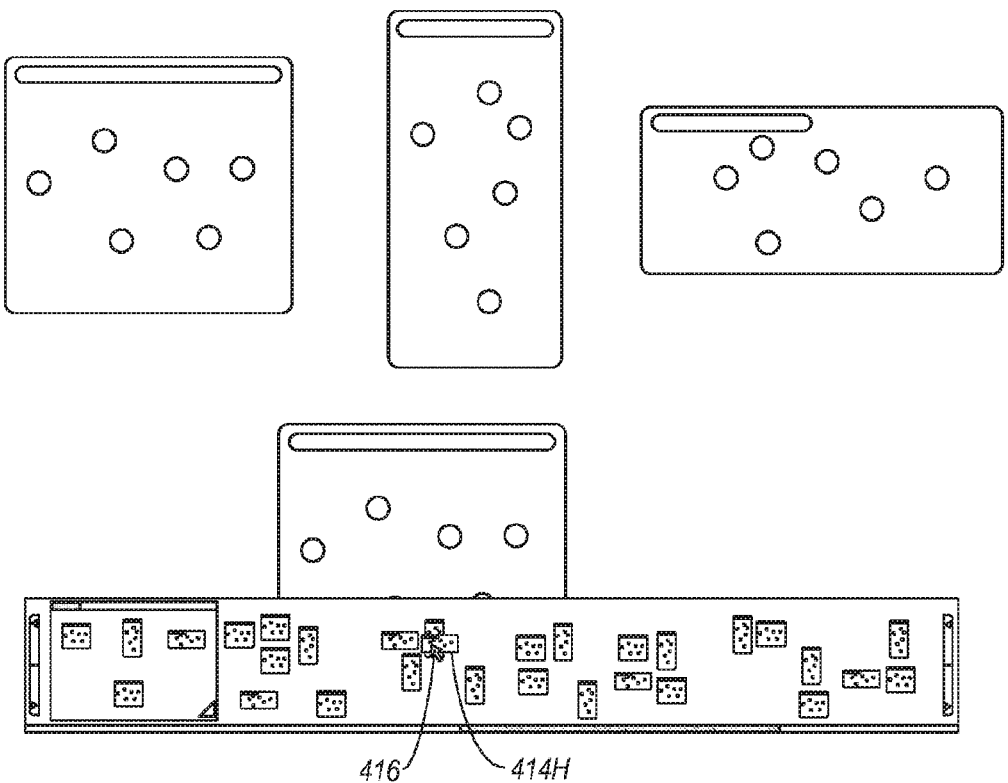
FIG. 7 illustrates the user interface of FIG. 6, with the selected object in the process of being moved to another location in the two-dimensional canvas.
Figure 8:
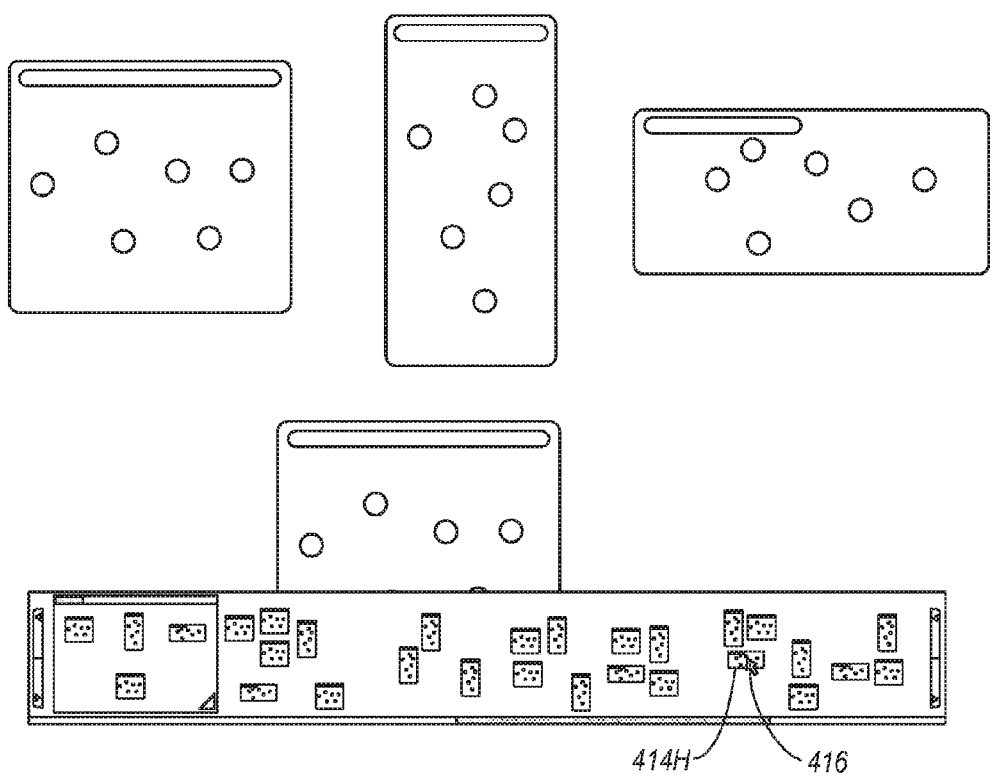
FIG. 8 illustrates the user interface of FIG. 6, with the selected object having completed the movement to another location in the two-dimensional canvas.

FIG. 6 illustrates a user interface 600, which is similar to the user interface 400 of FIG. 4, except with one of the miniaturized objects 414H being selected by the user pointer 416. Also, the richer preview 415 is no longer shown since the pointer is no longer hovering over the object that was being previewed using the richer preview 415 in FIG. 4. FIG. 6 through 8 are provided to illustrate an example of how objects may be repositioned within the canvas by manipulating their miniaturized versions in the miniaturized navigation canvas. FIG. 7 illustrates a user interface 700, which is similar to the user interface 600 of FIG. 6, with the selected object 414H in the process of being moved to another location in the two-dimensional canvas. In this case, the movement is accomplished via a drag operation using the user pointer 416. FIG. 8 illustrates a user interface 800, which is similar to the user interface 600 of FIG. 6, with the selected object 414H now moved to another location through the completion of the drag operation, and through a subsequent drop operation using the user pointer 416. Thus, the selected object has been moved within the canvas in the same manner as the corresponding miniaturized object has been moved within the miniaturized navigation campus.

Figure 9:
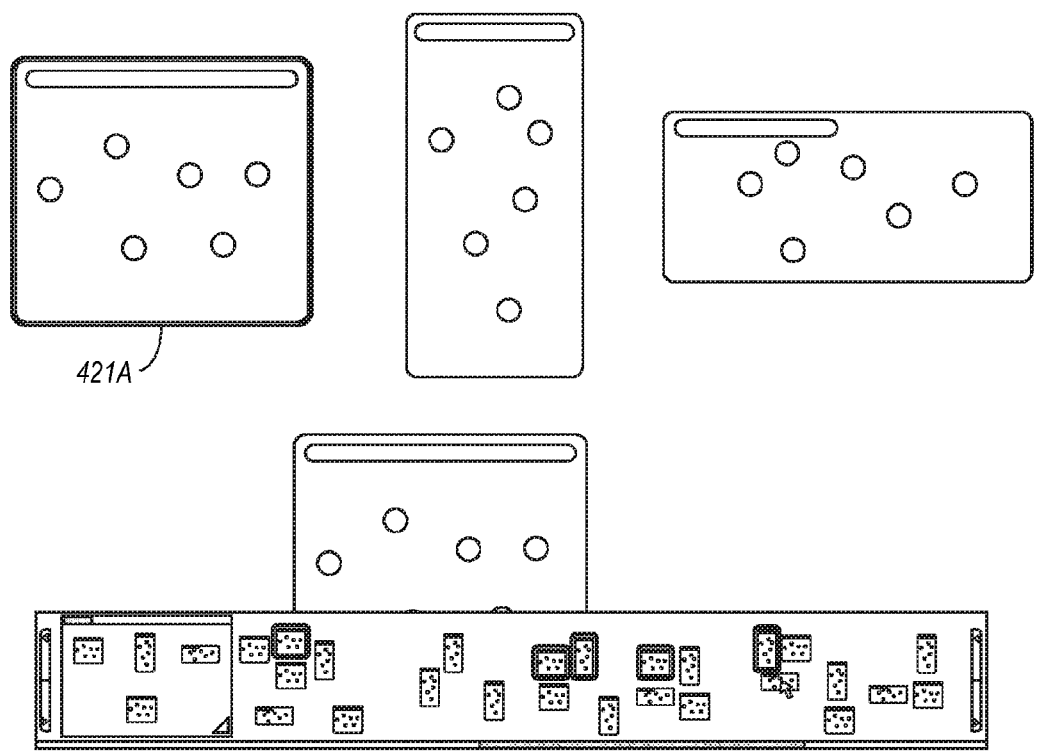
FIG. 9 illustrates the user interface of FIG. 4, except with one object selected in the edit view causing related objects to be visually emphasized in the miniaturized view of the two-dimensional canvas.

There can be other things done with the user interface of FIGS. 4 through 8, over and above moving objects from one location to another in the canvas, navigating to different portions of the canvas, and interacting with the various objects. In one embodiment, for example, a query may be made to the canvas logic, resulting in some change to the user interface to show the results of the query. For instance, one might query for all video content, resulting in all video objects to be highlighted in the miniaturized navigation canvas and/or the canvas itself. As other example, FIG. 9 illustrates a user interface 900 that is similar to the user interface of FIG. 4, except with one object 421A is highlighted to shown that this object is selected. In one embodiment, a query may be automatically made, or made in response to a user selection for the query to occur, in which all related objects are visually emphasized in the miniaturized navigation canvas.

Figure 10:
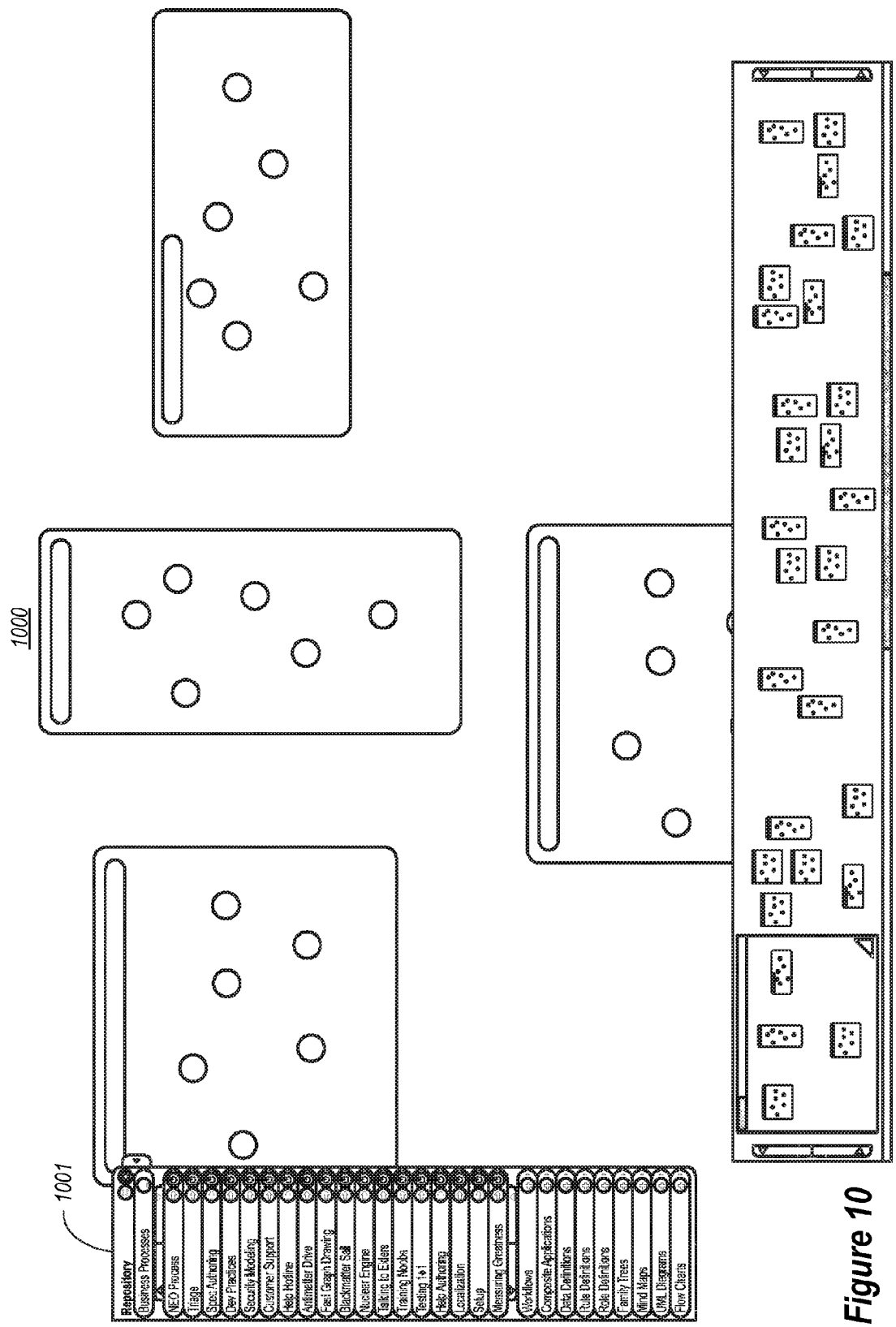
FIG. 10 illustrates a user interface in which the user may add objects to the canvas using an object selection menu.

FIGS. 2 and 4 through 9 presuppose the concept that there is a canvas that is populated by various objects. The principles described herein are not limited to any particular mechanism for placing those objects onto the canvas. However, FIG. 10 illustrates a user interface 1000 that represents one possible mechanism for how this might be accomplished. The user interface 1000 of FIG. 10 is similar to the user interface of FIG. 4, except that a repository browser 1001 is shown. The repository browser 1001 includes a listing of categories. Each element in the list may have an associated drop-down menu that might appear with the selection of a corresponding drop-down control. An object instance may be placed in the canvas, by selecting the appropriate object class from the drop-down menu and dragging the instance into the edit view, or into the miniaturized navigation campus.

Accordingly, a two-dimensional canvas may be navigated and manipulated using the principles described herein. FIGS. 11 through 15 illustrate the use of hyperboarding, which uses the concept of dashboards as a primary method for organizing and viewing content. In so doing, it channels usage patterns into three specific, but related, operations: viewing and editing dashboards, composing new dashboards, and locating objects to add to those dashboards.

Figure 11:
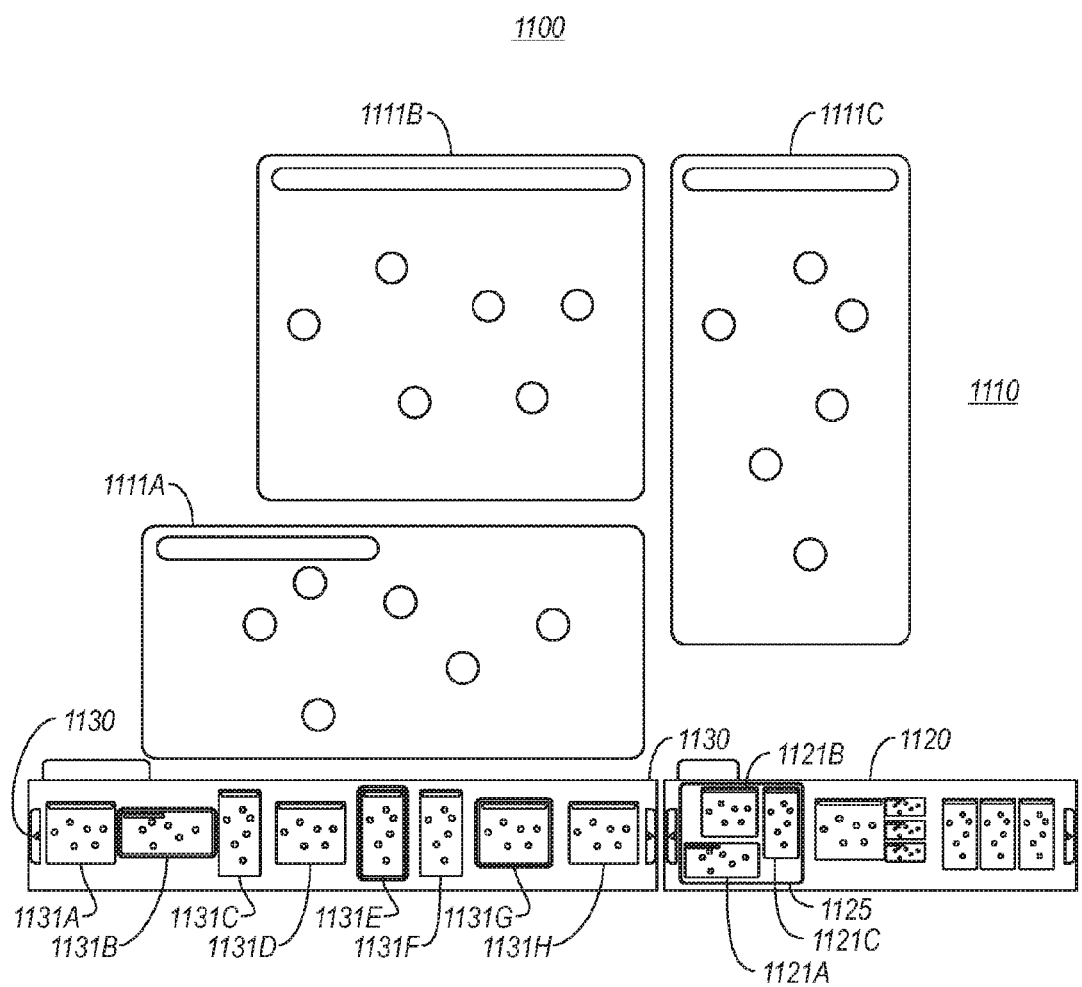
FIG. 11 illustrates an interactive work area for use in interfacing with different boards, each including related objects.

FIG. 11 illustrates an interactive user interface 1100 that includes a board edit area 1110, a board preview area 1120, and an object selection area 1130. The board edit area 1110 is for displaying heterogenic objects of a selected board. Once again, the heterogenic objects may be of a variety of types, each type having its set of controls specific to that type.

The board preview area 1120 includes a preview of at least a portion of the available boards, and includes a board selection mechanism for selecting the board to be displayed in the board edit area 1110. In FIG. 11, a board selection box 1125 is placed over a first board that includes objects 1121A, 1121B, and 1121C, which are miniaturized forms of the objects 1111A, 1111B and 1111C, respectively, illustrated in the board edit area 1110. The user might interact with the objects illustrated in the board edit area using the method 300 of FIG. 3 to invoke the various controls of the object.

The user interface 1100 also includes an object selection area 1130 for displaying at least a portion of available objects that are either included in one or more of the plurality of available boards, or that are available for insertion into one or more of the plurality of available boards. For instance, the object selection area 1130 illustrates eight objects 1131A through 1131H. More objects may be perhaps viewed by scrolling left or right in the object selection area 1130.

In one embodiment, the objects that are included in the selected board may be visually emphasized. For instance, since objects 1131B, 1131E and 1131G correspond to objects that are in the first board that is viewed in the board edit area 1110, those objects may be visually emphasized through, for example, highlighting. Additionally, the objects may also be visually emphasized in response to any other query as well. For instance, in a search for all objects that occupy over 1 megabyte of memory, or that are authored by a particular individual, those larger memory objects or those objects that were authored by the individual may be visually highlighted.

Figure 12:
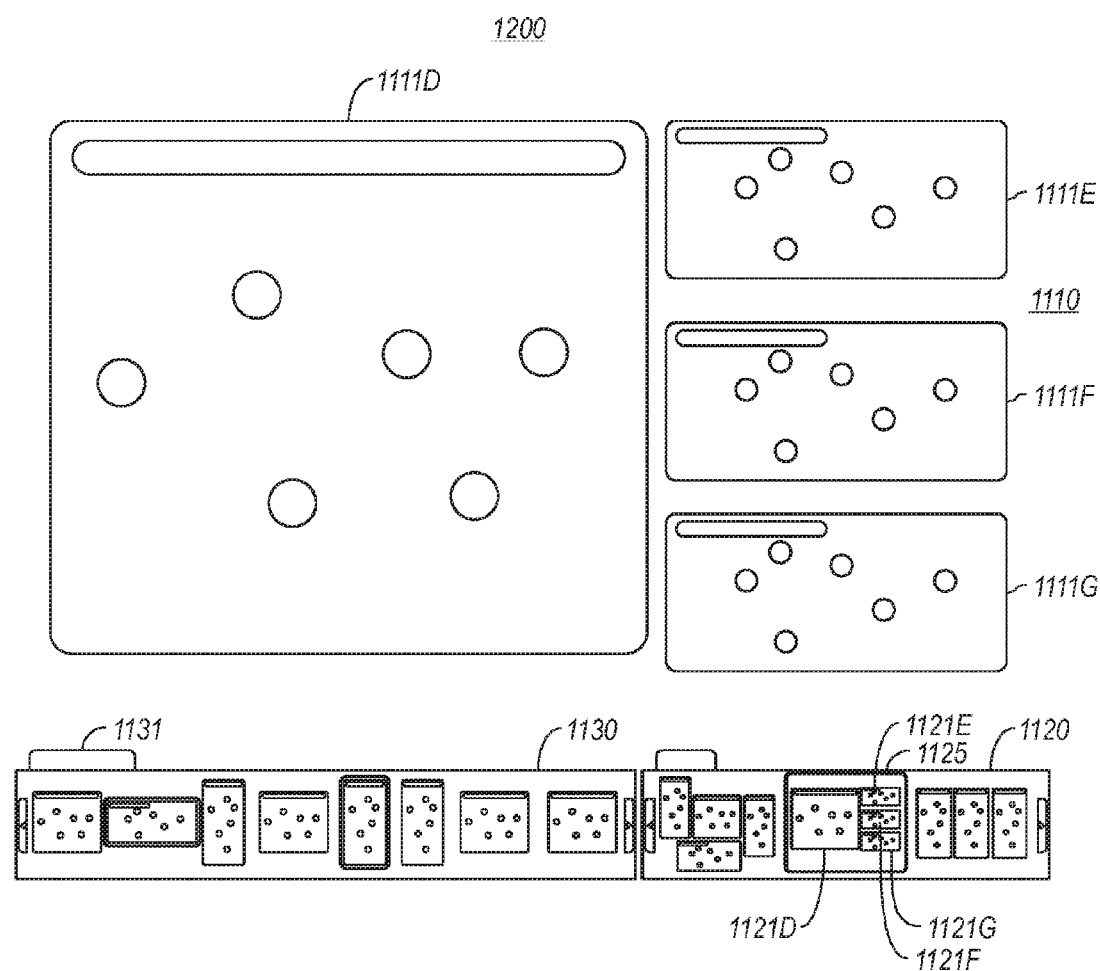
FIG. 12 illustrates the interactive work area of FIG. 11, except that the board selection mechanism has been used to select a different board.

FIG. 12 illustrates a user interface 1200, which is similar to the user interface 1100 of FIG. 11, except that the board selection mechanism has been used to select a different board for viewing in the board edit area. For instance, the board selection box 1125 has been moved to the right to focus the board edit area on a second board that includes objects 1111D through 1111G, which correspond to respectively miniaturized objects 1121D through 1121G. In one embodiment, the movement of the board selection box 1125 may be discrete, perhaps snapping to the nearest board boundaries with a drop of a drag/drop operation.

The view switching control 1131 may be used to switch views on how the objects are represented. For instance, the objects may be represented by tree structures or lists, instead of the standard boxes that are shown in FIG. 12.

Figure 13:
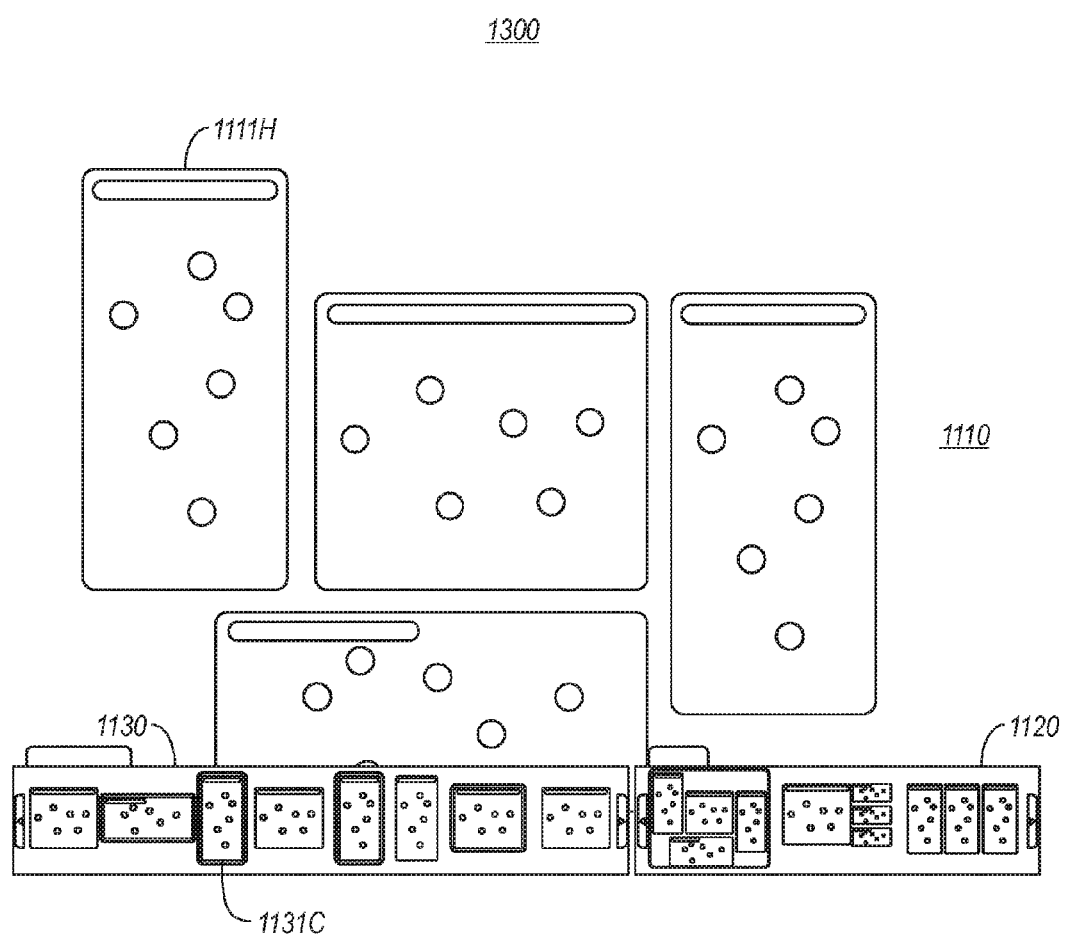
FIG. 13 illustrates the interactive work area of FIG. 11, except that an additional object has been added to the selected board.

FIG. 13 illustrates a user interface 1300 that is similar to the user interface 1100 of FIG. 11, except that an additional object has been added to the selected board. For instance, object 1131C has been dragged and dropped into the board preview area, causing an associated instance 1111H to be added to the first board. The board preview area 1120 is updated to move the board selection box 1125 to the first board since that is where the instance was added.

Figure 14:
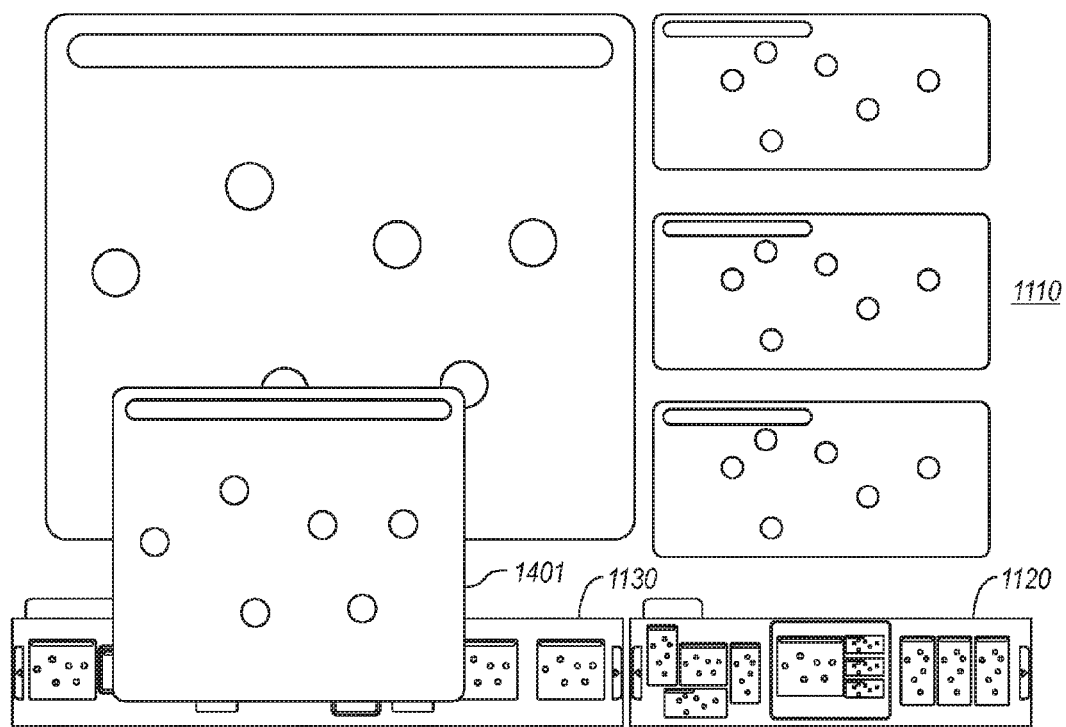
FIG. 14 illustrates the interactive work area of FIG. 12, except that one of the objects in the object selection area has been enlarged in an interactive preview form.

FIG. 14 illustrates the interactive work area of FIG. 12, except that one of the objects in the object selection area has been enlarged in an interactive preview form 1401. This may be accomplished by hovering over one of the objects in the object selection area 1130. In one embodiment, this object may even be interacted with using some, or even all, of the controls that would be available to the object if the object were fully within the board edit area 1110. Optionally, changes made to the object while in previous mode may be automatically or manually imposed upon the instances of the objects in the various boards, if there are instances of the object in a board.

Figure 15:
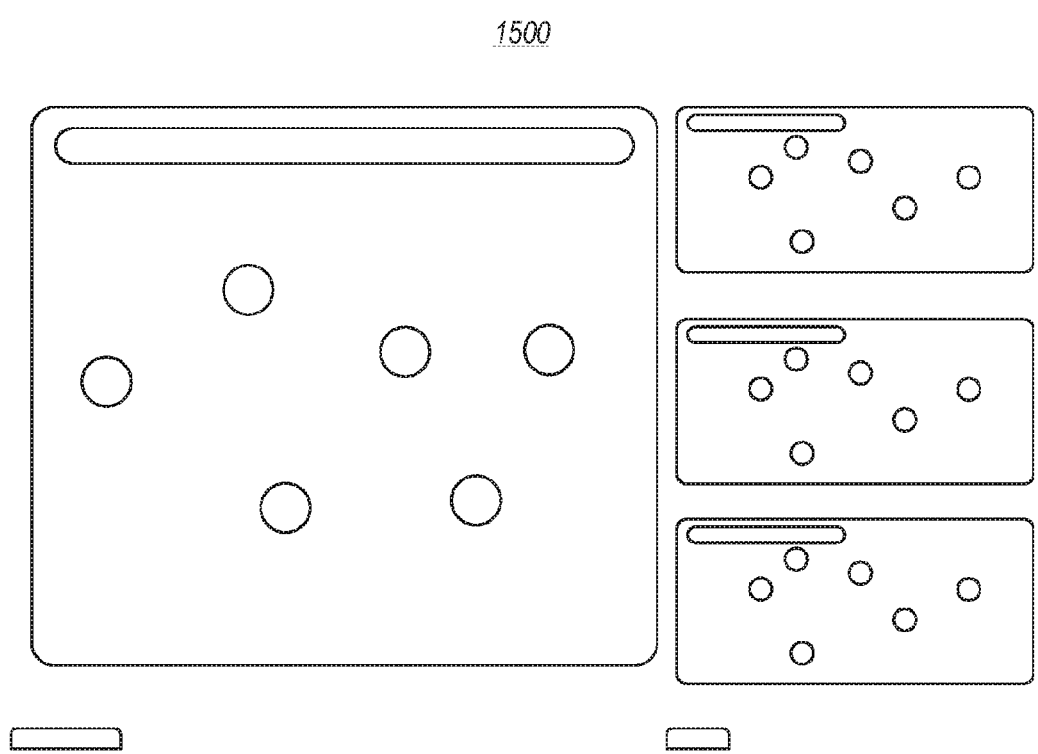
FIG. 15 illustrates the interactive work area of FIG. 12, except that one of that the object selection area and the board preview area are minimized.

FIG. 15 illustrates a user interface 1500 that is similar to the user interface 1200 of FIG. 12, except that one of that the object selection area and the board preview area are minimized to allow the full area of the board edit area to be accessed. The object selection area and the board previous area may include separate minimize control that may be used to reduce the corresponding areas to a simple maximize control, that if used may restore the area to its original form.

Accordingly, the principles described herein provide also an effective mechanism to navigate through and edit various boards of heterogenic objects. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for providing an extensible canvas for use in interfacing with heterogenic objects, the method comprising:
   an act of formulating a two-dimensional canvas onto which may be positioned a plurality of heterogenic objects of a plurality of types, each of the plurality of types having associated therewith a set of one or more controls that are at least collectively distinct, wherein the two-dimensional canvas is fixed in a first dimension, but extensible in a second dimension, at least in a first direction in the second dimension, such that if an object is to be placed in the first direction in the second dimension beyond a boundary of the two-dimensional canvas, the boundary is extended in the first direction such that the two-dimensional canvas includes the object;
   an act of displaying a miniaturized version of the two-dimensional canvas along with a miniaturized representation of at least one of one or more heterogeneous objects that are contained within the at least a portion of the two-dimensional canvas; and
   an act of providing a selectable scroll control with the miniaturized version of the two-dimensional canvas which, when selected, causes scrolling of the miniaturized representation in the first direction.

2. The method of claim 1, wherein the method further includes:
   detecting user input directed to an object of the plurality of heterogenic objects that a user is interfacing with;
   identifying a type of the object that the user is interfacing with; and
   applying a control to the identified object, the control corresponding to the user input and the object type.

3. The method of claim 1, wherein the two-dimensional canvas is also extensible in a second direction in the second dimension such that if an object is to be placed in the second direction in the second dimension beyond a boundary of the two-dimensional canvas, the boundary is extended in the second direction such that the two-dimensional canvas includes the object.

4. The method of claim 3, wherein the method further includes providing a different selectable scroll control with the miniaturized version of the two-dimensional canvas which, when selected, causes scrolling of the miniaturized version of the two-dimensional canvas in the second direction.

5. The method of claim 1, further comprising:
   an act of displaying a view box superimposed on the miniaturized version of the two-dimensional canvas and which displays at least one of the objects within the view box, the view box having a zoom control for resizing the view box and which causes resizing of any objects displayed within the view box when the view box is resized by the zoom control.

6. The method of claim 5, wherein the method further includes an act of displaying an edit view on the display, the edit view being an enlarged view of the superimposed portion of the two-dimensional canvas that is superimposed on by the view box, wherein the edit view exposes the set of one or more controls associated with at least some of the objects that are displayed in the edit view.

7. The method of claim 6, wherein the method further includes providing a control that, when manipulated, causes the view box to be to translationally moved along the miniaturized version of the two-dimensional canvas thereby changing the portion of the two-dimensional canvas that is displayed in the edit view.

8. The method of claim 6, wherein the method further includes:
an act of causing the at least some objects displayed in the edit view be zoomed in or zoomed out within the edit view when the zoom control is used to resize the view box.

9. The method of claim 6, further comprising:
an act of providing a mechanism for a user to select an object in the edit view; and
an act of emphasizing visually one or more other objects that are represented in miniaturized form on the miniaturized version of the two-dimensional canvas and that are related to the selected object in the edit view.

10. The method of claim 1, further comprising:
an act of providing a control that allows a user to gain a richer preview of a miniaturized form of a particular object displayed on the miniaturized version of the two-dimensional canvas when hovering over the particular object with a mouse prompt.

11. A computing system comprising:
at least one processor; and
system memory storing computer-executable instructions which, when executed by the at least one processor, implement a method for providing an extensible canvas for use in interfacing with heterogenic objects, the method comprising:
an act of formulating a two-dimensional canvas onto which may be positioned a plurality of heterogenic objects of a plurality of types, each of the plurality of types having associated therewith a set of one or more controls that are at least collectively distinct, wherein the two-dimensional canvas is fixed in a first dimension, but extensible in a second dimension, at least in a first and second direction in the second dimension, such that if an object is to be placed in the first direction in the second dimension beyond a boundary of the two-dimensional canvas in the first direction, the boundary is extended in the first direction to include the object and such that if the object is to be placed in the second direction in the second dimension beyond a boundary of the two-dimensional canvas in the second direction, the boundary is extended in the second direction to include the object;
an act of displaying a miniaturized version of the two-dimensional canvas along with a miniaturized representation of at least one of one or more heterogeneous objects that are contained within the at least a portion of the two-dimensional canvas;
an act of providing a selectable scroll controls with the miniaturized version of the two-dimensional canvas which, when selected, causes scrolling of the miniaturized representation in the first and second directions; and
an act of displaying a view box superimposed on the miniaturized version of the two-dimensional canvas and which displays at least one of the objects within the view box, the view box having a zoom control for resizing the view box and which causes resizing of any objects displayed within the view box when the view box is resized by the zoom control.

12. The method of claim 11, wherein the method further includes an act of displaying an edit view on the display, the edit view being an enlarged view of the superimposed portion of the two-dimensional canvas that is superimposed on by the view box, wherein the edit view exposes the set of one or more controls associated with at least some of the objects that are displayed in the edit view.

13. The method of claim 12, wherein the method further includes providing a control that, when manipulated, causes the view box to be to translationally moved along the miniaturized version of the two-dimensional canvas thereby changing the portion of the two-dimensional canvas that is displayed in the edit view.

14. The method of claim 12, wherein the method further includes:
an act of causing the at least some objects displayed in the edit view be zoomed in or zoomed out within the edit view when the zoom control is used to resize the view box.

15. The method of claim 12, further comprising:
an act of providing a mechanism for a user to select an object in the edit view; and
an act of emphasizing visually one or more other objects that are represented in miniaturized form on the miniaturized version of the two-dimensional canvas and that are related to the selected object in the edit view.

16. The method of claim 12, further comprising:
an act of providing a control that allows a user to gain a richer preview of a miniaturized form of a particular object displayed on the miniaturized version of the two-dimensional canvas when hovering over the particular object with a mouse prompt.

17. A computer storage device storing computer-executable instructions which, when executed by at least one processor of a computing system, implement a method for providing an extensible canvas for use in interfacing with heterogenic objects, the method comprising:
an act of formulating a two-dimensional canvas onto which may be positioned a plurality of heterogenic objects of a plurality of types, each of the plurality of types having associated therewith a set of one or more controls that are at least collectively distinct, wherein the two-dimensional canvas is fixed in a first dimension, but extensible in a second dimension, at least in a first and second direction in the second dimension, such that if an object is to be placed in the first direction in the second dimension beyond a boundary of the two-dimensional canvas in the first direction, the boundary is extended in the first direction to include the object and such that if the object is to be placed in the second direction in the second dimension beyond a boundary of the two-dimensional canvas in the second direction, the boundary is extended in the second direction to include the object;
an act of displaying a miniaturized version of the two-dimensional canvas along with a miniaturized representation of at least one of one or more heterogeneous objects that are contained within the at least a portion of the two-dimensional canvas;
an act of providing a selectable scroll controls with the miniaturized version of the two-dimensional canvas which, when selected, causes scrolling of the miniaturized representation in the first and second directions;
an act of displaying a view box superimposed on the miniaturized version of the two-dimensional canvas and which displays at least one of the objects within the view box, the view box having a zoom control for resizing the view box and which causes resizing of any objects displayed within the view box when the view box is resized by the zoom control; and an act of providing a control that initiates a richer preview display of a particular object displayed on the miniaturized version of the two-dimensional canvas when selected.

18. The computer storage device of claim 17, wherein selecting the particular object comprising placing a mouse prompt over the particular object.

19. The computer storage device of claim 17, wherein the method further includes:

an act of displaying an edit view on the display, the edit view being an enlarged view of the superimposed portion of the two-dimensional canvas that is superimposed on by the view box, wherein the edit view exposes the set of one or more controls associated with at least some of the objects that are displayed in the edit view;

an act of providing a mechanism for a user to select an object in the edit view; and an act of emphasizing visually one or more other objects that are represented in miniaturized form on the miniaturized version of the two-dimensional canvas and that are related to the selected object in the edit view.

20. The computer storage device of claim 17, wherein the computing system comprises the at least one processor and the computer storage device.

* * * * *